Feb. 10, 1959 KARL-HEINZ KREISSLER 2,872,952
APPARATUS FOR PRODUCING AND AUTOMATICALLY DELIVERING
FRUIT-FLAVOURED SODA WATER INTO DRINKING VESSELS
Filed June 10, 1954 2 Sheets-Sheet 2
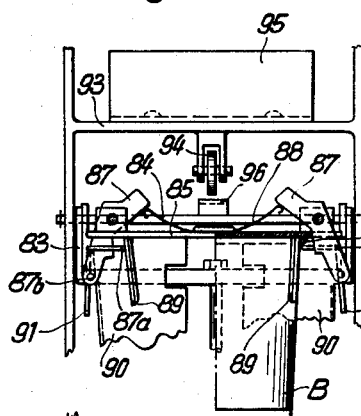
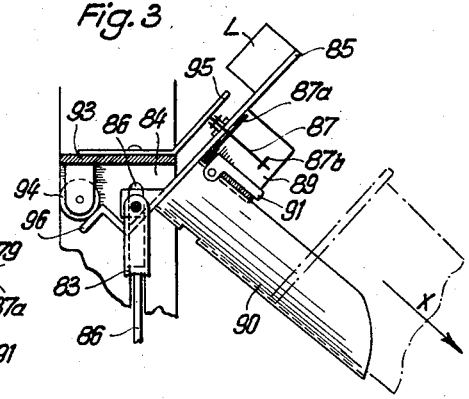
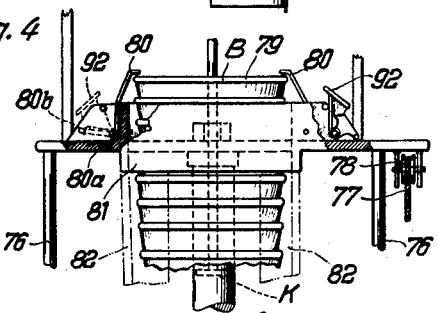
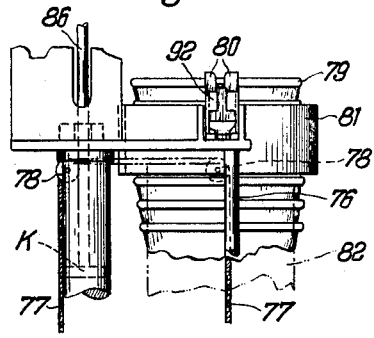
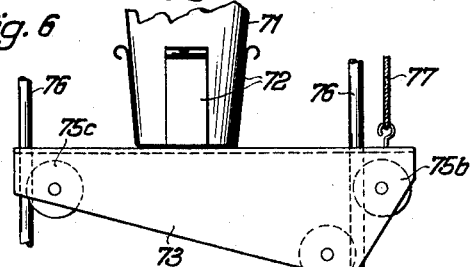
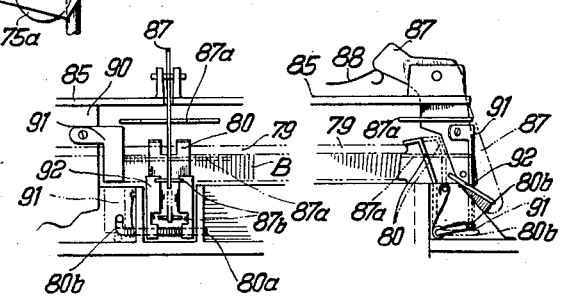
Inventor:
K. H. Kreissler United States Patent Office 2,872,952
Patented Feb. 10, 1959

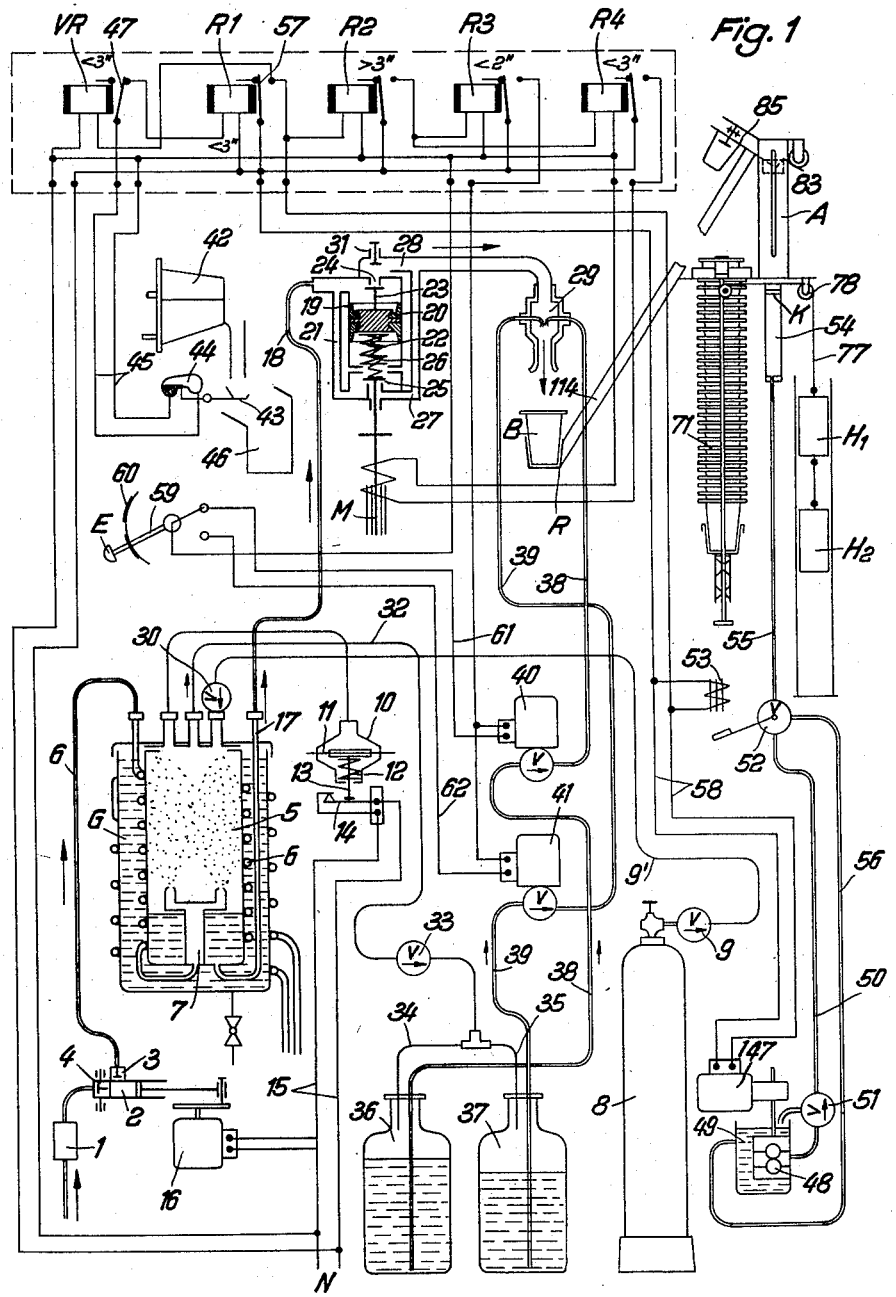

2,872,952
APPARATUS FOR PRODUCING AND AUTOMATICALLY DELIVERING FRUIT-FLAVOURED SODA WATER INTO DRINKING VESSELS

Karl-Heinz Kreissler, Schoningen, near Braunschweig, Germany

Application June 10, 1954, Serial No. 435,825

Claims priority, application Germany August 30, 1952

15 Claims. (Cl. 141—105)

The present application relates to an apparatus for the production and automatic delivery of fruit-flavoured soda water into drinking vessels. As regards its operation, the novel apparatus is characterized in that the drinking water at elevated pressure has the carbon dioxide added to it in the said apparatus and this flavour-free soda water has added to it a fruit juice selected from a number of fruit juices by the customer only at the instant of delivery, that is to say, the operation of the apparatus by the said customer, so that therefore the fruit-flavoured soda water can be extracted in a condition as freshly prepared by the customer.

According to the invention, an installation for the preparation and delivery of fruit-flavoured soda water is structurally combined with one, or more than one, automatic beaker-dispensing device in such manner that both are controlled in dependence upon one another by the same and preferably electric switching mechanism. Consequently, the customer has merely to select the fruit juice he requires by actuating a pre-selector device and to set the electric switching device in operation by insertion of a coin in order to produce the required fruit-flavoured soda water and to extract a drinking beaker filled therewith from the delivery position of the automatic machine.

Further details of the invention are hereinafter described with reference to the accompanying drawings wherein:

Figure 1 is a circuit diagram of the new apparatus;

Figure 2 is a front elevation of a beaker-separating device, partly in section;

Figure 3 is a sectional side elevation of Figure 2 with the beaker-separating device in another position;

Figure 4 is a front elevation of the upper end of a stack of drinking beakers;

Figure 5 is a side elevation of Figure 4;

Figure 6 is a front elevation of a carriage supporting the stack of beakers;

Figure 7 is a front elevation of the holding, separating and controlling members of the beaker-separating device; and Figure 8 is a side elevation of Figure 7.

The drinking water to be converted into soda water beverage is fed by way of a fine-mesh filter 1 to a pressure pump 2 by way of suitably arranged non-return valves 3 and 4, enters the pipe line 6 arranged externally around the impregnation vessel 5 fitted into a cooling tank G and permeating the drinking water with carbon dioxide, and passes at the base of the vessel 5 into the nozzle stem 7. At this point, the drinking water is injected at high pressure into the impregnation vessel 5 which is filled from the carbon dioxide bottle 8 by way of a pipe 9' provided with a reducing valve 9 and the non-return valve 30 and collects at the bottom of this vessel 5.

The drinking water pressure produced by the pump 2 is always higher than the pressure of the carbon dioxide introduced thereinto. The pressure obtaining in the vessel 5 is increased by the quantity of water injected into the vessel. Connected to the impregnation vessel 5 is the diaphragm control device 10, so that the fluctuations in pressure of the vessel are transmitted to the diaphragm 11. The spring 12 loading the diaphragm 11 is so set that when the vessel is filled with liquid up to the nozzle stem 7, the increase in pressure which is produced flexes the diaphragm 11 of the control device and thus enables the diaphragm pin 13 to project. This opens the contact 14 and thus the circuit 15 of the pressure pump 2. The diaphragm control device 10, 11 thus ensures that always the same quantity of water is located in the impregnation vessel 5 and, with the emptying of the vessel 5, provides for the automatic refilling up to the level of the nozzle stem 7 by way of a rising pipe 17 connected to the base. By the water being split up into extremely small droplets in the nozzle stem 7, the surface of the drinking water is greatly increased, the air always dissolved in the water is separated out, said air collecting at the top in the vessel, and the water is strongly concentrated with carbon dioxide to provide soda water.

By way of a pipe 18, this unflavoured soda water passes to a control valve 19, reaching the upper side of the floating piston 20 thereof which is acted upon on both sides, and also reaches the under side thereof by way of a constricted by-pass passage 21. A strong spring 22 constantly urges the piston 20 in an upward direction so that a valve plunger 23 connected therewith closes the upper outlet aperture 24 of the control valve 19, said aperture having a discharge pipe 28 connected thereto. The cylinder space below the floating piston 20 is closed downwardly by the bottom valve 25, which is loaded by a small spring 26 which is weaker than the heavy spring 22.

If this valve 25 is lifted by the release magnet M during the operation of the automatic machine as hereinafter described, the soda water located beneath the piston passes through the passage 27 into the discharge pipe 28 at top of the control valve 19 and flows through a mixing head 29 into a beaker B positioned below the latter. With actuation of the bottom valve 25, the floating piston 20 is forced downwardly by the pressure of the soda water owing to the difference in cross-section between the inside diameter of the cylinder and that of the by-pass passage 21 and opens the upper discharge opening 24 of the control valve 19. The soda water flowing from the pipe 18 now flows through the connecting pipe 28 into the mixing head 29 and thereby closes the aeration valve 31 arranged in this pipe, due to the pressure thereof. Therefore, a large quantity of soda water flows through the discharge opening 24 in the upper part of the control valve 19 and a small quantity of soda water flows through the bottom valve 25 and by way of the connecting pipe 28 into the mixing head 29 as long as the said valve 25 is opened. If the latter is closed, equalization of pressure is again produced on the top and bottom sides of the floating piston 20 in an extremely short time, so that the strong closing spring 22 is able to force the floating piston 20 back to its initial position and thus to close the main discharge opening 24 again by the valve stem 23. Due to this transmission of force, the control valve 19 loaded by medium pressures is operated by comparatively small forces.

The carbon dioxide pressure in the impregnating vessel 5 is also conducted by way of a pipe 32 to a reducing valve 33 and is conducted from here at reduced pressure into the fruit juice bottles 36 and 37 connected by the pipes 34 and 35. At the same time, the air collecting at the top in the impregnation vessel 5 is discharged through the pipe 32 into the bottles 36 and 37. The gas pressure produced by this air and the carbon dioxide in the said bottles acts on the fruit juice and causes the fruit juice to be fed by way of pipes 38, 39 to electrically actuated valves 40, 41, so that when the latter are actuated, the juice flows through the pipes 38, 39 into the mixing head 29.

An automatic delivery of drinking beakers in the automatic machine is effected by oil pressure or by any other mechanical means. An electric motor 147 drives an oil pump 48 which supplies the oil in a container 49 through the pipe 50 and the spring loaded excess pressure valve 51 to the changeover valve 52. When the valve 52 is operated by a magnetic switch 53, it is opened and sends the oil pressure through the pipe 55 to beneath the piston K which is displaceable in the cylinder 54 and which is associated with one or more than one beaker supply device A. The piston K travels up to an end stop and thus operates the delivery of a beaker.

The magnetic switch 53 is electrically connected in parallel with the electric motor 147 driving the oil pump 48. If the latter is therefore switched off again by the electrical control means, the magnet armature of the change-over valve 52 also falls off in the manner indicated, due to its own weight or by means of a return spring. Accordingly, by rotation of the eccentric rotary slide valve of the change-over valve 52, the pipe 55 leading to the working cylinder 54 is connected to the discharge pipe 56 which opens into the oil container 49.

Owing to its own weight and the weight of a guide block or slide extracting the beaker B from a stack 71, the piston K can return to its initial position as the oil in the cylinder 54 is discharged into the oil container 49.

If the automatic beverage machine is operated by insertion of a coin, the latter, after travelling through the coin tester 42, passes to the lever 43 of the pivotally mounted mercury relay 44 and the weight thereof causes the said relay to be tilted and closes its contact, i. e. the electric line 45.

After reaching the lever stop, the coin leaves the latter and drops into the coin box 46.

By closing the coin testing contact 44, the coil of a relay $R_1$ is connected to the mains supply N by the closed off-normal contact 47 of an electric time relay VR and thereby the said relay $R_1$ is actuated. The latter is a retarding relay which is switched on immediately by the closing of its contact 47 and is switched off again after three seconds when it is no longer energized. By actuating the relay $R_1$, the relay VR is connected to the mains supply, whereby its contact 47 is opened and thus breaks the circuit of relay $R_1$. The latter commences its return movement.

By closing the contact 57 of the relay $R_1$, the line 58 of the motor 147 of the oil pump 48 for delivering a beaker is connected to the main supply for three seconds and simultaneously the magnetic switch 53 of the change-over valve 52 is connected to the mains. The beaker B is withdrawn in about two seconds and reaches the delivery position R below the mixing valve 29 in about one second. The delay of three seconds in switching-off the relay $R_1$ therefore results in one beaker B passing by way of a slide track 114 beneath the outlet of the mixing head 29. When the relay $R_1$ is connected to the mains supply, the relay $R_2$ is connected thereto at the same time. This is switched on with a delay of three seconds and switches off immediately when it is no longer energized.

The delay in switching-on of the relay $R_2$ is chosen to be somewhat shorter than the delay in switching-off the relay $R_1$. Therefore, when the relay $R_2$ is switched on, the relay $R_1$ is switched off a little later.

When the relay $R_1$ is switched off, the return travel of the relay VR commences with a delay of three seconds. There is effected a switching-on of the relay VR after a period of six seconds. Consequently, before six seconds have expired, it is not possible for any fresh impulse of the coin tester 42 to be received by the electrical control means. The electrical control means is therefore locked electrically after release for a period of six seconds in relation to the next actuation of the automatic machine and during this period the devices of the automatic machine can operate without interruption.

The relays $R_3$ and $R_4$ are switched on simultaneously with the relay $R_2$ being switched on. Both these relays switch on immediately, while the relay $R_3$ is switched off after two seconds and $R_4$ after three seconds when the energization ceases.

Being connected to the electric valves of the fruit juice pipes 38 and 39, the relay $R_3$ either connects the valve 40 or the valve 41 to the main supply, according to the position of a pre-selector switch E, and the relay $R_4$ connects the magnetic switch M of the control valve 19 to the mains supply. The delivery of soda water and fruit juice then takes place, commencing simultaneously, the soda water having the longer running time in accordance with the delay of the relay $R_4$, so that the discharging soda water scavenges the mixing head 29 and entrains with it any residues of fruit juice from the ends of the pipes 38 and 39.

The switching unit of the automatic machine carries an electrical pre-selector device E, with which the customer, by operating a selector lever 59 with a pointer on an indicating scale 60, selects the fruit juice he desires by the fact that thereby either the line 61 of the electric valve 40 or the line 62 of the valve 41 is preparatorily connected to the main supply. This pre-selection is carried out before the coin is inserted, that is to say, before starting the electric switching arrangement which initiates the separate operations.

According to the present invention, the topmost beaker of a stack of beakers is separated and withdrawn from the stack in the axial direction.

For this purpose, the stack 71 is carried by a centering member 72 of a beaker carriage 73 which may consist, for example, of a sheet metal member which is U-shaped in cross-section. The carriage is adapted to travel up and down easily and free from vibration by means of rollers 75a and 75b and a guide roller 75c on suitable guide rods 76 of the frame. By means of a cable 77 and rollers 78 (Figures 4 and 5), it is under the action of suitable weights $H^1$ and $H^2$ (Figure 1) in such manner that it always displaces the stack of beakers to such an extent in the upward direction that the beaded rim 79 of the topmost beaker B strikes against a suitable stop. The said stop is mainly formed by two or more oppositely disposed stop levers 80 (Figures 4 and 5) which are mounted to rotate about spindles 80a and are held by spring action in the stop position. The spindles 80a end in lever-like extensions 80b.

The weight moving the beaker carriage 73 may consist of separate weights $H^1$, $H^2$ which are successively rendered inoperative in a manner known per se in accordance with the decreasing height of the stack.

The operating part thereof can be restricted to a minimum by using a cable system with free and fixed pulleys (block and tackle or the like).

The upper end of the stack 71 of beakers is centered by a guide ring 81 which surrounds it externally and which may be continued downwardly in the direction of the stack in the guide plate 82 and be mounted to the fixed frame. The separation of the topmost beaker is effected according to the invention by a beaker slide 83 which is provided with suitable means and is movable up and down axially of the stack.

However, the part effecting the separation may be fixed and the stack may be withdrawn downwardly from the stationary topmost beaker.

An example of the first-mentioned construction is shown in the drawing.

In this constructional form, a pressure plate 85 on the beaker slide 83 is arranged to be rockable about a shaft 84. The slide 83 is moved with a sliding movement up and down in lateral guide slots 86 parallel to the axial direction of the stack 71, hydraulically as above described by the piston K (Figures 1 to 4) or in any other suitable manner.

Pivotally mounted on the pressure plate 85 are two or more oppositely disposed gripper levers 87 which engage downwardly by means of suitable extensions through slots in the pressure plate 85. At a suitable distance below the pressure plate 85, the extensions carry gripper arms 87a and at the bottom ends thereof lateral control pins 87b.

Arranged beneath the pressure plate 85 are wing members 89 in such manner that with downward movement of the beaker slide 83, they are able to engage in the topmost beaker B of the stack (right half of Figure 2). The leaf spring 88 ensures that the gripper levers 87 with the gripper arms 87a bear evenly under spring action on the wing members 89. Underneath the pressure plate 85, there are also arranged deflecting plates 90 which are moved past the outside of the upper end of the stack when the beaker slide moves downwardly, said plates 90 supporting plunger members 91 near the gripper levers 87.

When the beaker slide 83 is moved downwardly, the control pins 87b first of all strike against inclined control surfaces 92 on pivoted levers which are positioned on the outside in front of the stop levers 80 and are so resiliently forced about their pivot shafts towards a fixed stop on the frame that they can only deflect outwardly, this being possible when they are moved beneath the control pins 87b.

With the continued downward movement of the control slide 83, the gripper levers 87 with their control pins 87b are rocked outwardly about their axis by the surfaces 92 until the gripper levers 87 can spring back to their original positions at the end of the control surfaces 92. By this operation, the gripper levers 87 with their gripping and separating arms 87a are hooked around the bead 79 of the topmost beaker D of the stack 71 and the control pins 87b are positioned underneath the control surfaces 92.

During this movement, the beaker slide 83 has been moved downwardly to such an extent that the gripper arms 87a of the gripper lever 87 in their return springing movement have been positioned beneath the beaded edge 79 of the topmost beaker B (see Figures 7 and 8).

Simultaneously with this operation, the plungers 91 have forced the levers 80b downwards and thus forced the stop levers 80 from their holding position.

The stack of beakers 71, which has thus become free, moves a slight distance in the upward direction until beneath the pressure plate 85 under the action of the cable weights.

With the commencement of the upward movement of the beaker slide 83, the pressure plate 85 with the gripper arms 87a carries the topmost beaker B with it. It is just at the commencement of this upward movement, that the stop levers spring back to their holding position, since the two plungers 91 have left the lever-shaped extensions 80b of their shafts 80a, so that the remainder of the stack 71 again abuts thereon by means of the beaded edge 79 of the beaker which now constitutes the topmost beaker B.

The control pins 87b of the gripper levers 87 thereby force the resiliently mounted slide or control surfaces 92 disposed in their path in an outward direction laterally, which surfaces thereafter spring back into the "ready" position shown in Figure 3 after striking the fixed stop on the frame.

The pressure plate 85 carries the separated beaker B upwardly with it, at least until the full height thereof is withdrawn from the stack 71.

In order to move the beaker which has been separated in this manner away from the axis of the stack of beakers 71, it is possible according to the present invention to provide suitable movable members or the like.

However, as shown in Figures 2 and 3, the beaker can also be tilted from the axial direction of the stack of beakers, can then be released from the separating members 87 and be conducted by gravity or by suitable means to the beaker delivery position R.

For this purpose, according to the invention, a fixed pulley bridge 93 is arranged on the frame at the upper end of the slide track 86 of the beaker slide 83, said bridge carrying on its underside a suitably mounted stop pulley 94 and on its upper side a stop surface 95 which is inclined towards the direction of movement of the beaker slide 83.

In its upward movement, the pressure plate 85 abuts by means of a suitably shaped lever arm 96 against the stop pulley 94 in such manner that with continued upward movement of the beaker slide 83, the pressure plate 85 with the beaker B held beneath it by gripper arms 87a is rocked about shaft 84.

At the end of the tilting or rocking movement, the gripper levers 87 with their nose-shaped upper portions strike against the inclined stop surface 95 and are thereby pivoted in such manner that their gripper arms 87a release the beaded rim 79 of the beaker, so that the latter slides off the wing members 89 and may slide on the deflecting surfaces 90 in the direction of the arrow $x$ into a suitable chute 114 or the like.

During the downward movement thereof which then commences and after removal of the driving force, the pressure plate 85 pivots back to its initial position shown in the left half of Figure 2, and the cycle can be repeated when the next coin is inserted.

The downward movement of the beaker slide and the movement of the holding, separating and controlling members is effected according to the invention solely by the weight of the pressure plate 85.

For this purpose, the said plate may be loaded with suitable additional weights L (Figure 3) if its own weight should not be sufficient. The upward and downward movement of the beaker slide may however also take place positively in both directions, for example by oil pressure.

What I claim as new and desire to secure by Letters Patent of the United States is:

1. In an apparatus for the production and automatic delivery of fruit flavored soda water in drinking beakers, the combination comprising a beaker stack, means for separating and removing the uppermost beaker from said stack, supply means for a plurality of different fruit juice supplements and soda water, a series of electronic time relays, a first one of said relays responsive to the insertion of a coin to control the operation of said separating and removing means and to connect a second of said relays to control said supply means in dependence on one another, and pre-selector means for the fruit juice supplements operable by an operator of the apparatus, the said relays having respective time delays to produce a locking circuit upon coin insertion.

2. The invention as set forth in claim 1, including a plurality of fruit juice containers, water and juice mixing means, an assemblage of pipes having respective electrically controlled valves connecting between the containers and the mixing means, and a circuit to connect a selected valve with one of said relays upon actuation of the said pre-selector means by the operator.

3. The invention as set forth in claim 2, including a carbon dioxide impregnating vessel, means to admit pressurized carbon dioxide to the vessel, means to supply drinking water to said vessel, a motor driven pump connected to said vessel, and means responsive to the pressure in said vessel to actuate the motor and drive the pump.

4. The invention as set forth in claim 3, wherein the pressure developed in the drinking water by the pump is greater than the pressure of carbon dioxide gas entering the vessel.

5. The invention as set forth in claim 4, including a mixing head, means connecting the said impregnating vessel with said mixing head, a control valve in said last recited means, and a shut off member to operate the control valve, said shut off member comprising a floating piston controlled electrically and operated hydraulically by the soda water pressure.

6. In an apparatus for the production and automatic delivery of fruit flavored soda water in drinking beakers, the combination comprising a beaker stack, means for separating and removing the uppermost beaker from said stack, supply means for a plurality of different fruit juice supplements and soda water, a series of relays, a first one of said relays responsive to the insertion of a coin to control the operation of said separating and removing means and to connect a second of said relays to control said supply means in dependence on one another, and pre-selector means for the fruit juice supplements operable by an operator of the apparatus, the said relays having respective time delays to produce a locking circuit upon coin insertion, the said beaker separating and removing means including means for moving the uppermost beaker and the remaining beakers of the stack apart axially, and means for swinging the separated beaker from its axial position in the stack in an outward direction.

7. The invention as set forth in claim 6, including a carriage to support the said stack of breakers, at least one weight urging the said carriage to move vertically upward in the machine, and holding means preventing the upward movement of the carriage through engagement over the rim of the topmost beaker and adapted to swing resiliently outward from holding position.

8. The invention as set forth in claim 7, including a slide member carrying resiliently mounted separating members to separate a beaker from the top of the stack of beakers, actuating means to vertically move said slide member and controlled by said relays whereby the said separating members are moved beneath the rim of the topmost beaker and the said holding means is removed to thereby withdraw the topmost beaker from the stack and engage the said holding means over the rim of the next following beaker.

9. Apparatus according to claim 8, including a track for said slide member, a stop surface formed at the upper end of said track to move the said resiliently mounted separating members into open position by engagement thereagainst during upward movement of the slide member.

10. Apparatus according to claim 9, including a pressure plate mounted on the said slide member and carrying the separating members, and a stop fixedly arranged in the path of said slide member to tilt the same about a shaft in said slide member during the upward movement of the slide member, and a weight acting against the tilting motion.

11. Apparatus acording to claim 10, including an upper ring, control means resiliently mounted on said ring and disposed on top of the beaker stack in the path of the separating members, said control means being adapted to deflect the separating members outwardly during the downward movement and displaced outwardly by said separating members during upward movement thereof.

12. Apparatus according to claim 11, including plungers arranged on the said pressure plate to withdraw the holding means from the rim of the topmost beaker of the beaker stack at the end of the downward movement of the slide member.

13. Apparatus according to claim 12, in which the weight of the pressure plate carrying the separating members initiates the control movement of the separating, holding and controlling members, and a spring urging against the weight thereof.

14. The invention as set forth in claim 7, including a weight urging the beaker carriage upward, said weight being subdivided into a plurality of segments which are successively rendered inoperative in accordance with the decreasing height of the stack supported by the carriage, and a plurality of rods to guide said carriage.

15. The invention as set forth in claim 14, including a series of rollers and a guide roller to support the said beaker carriage on the said rods.

References Cited in the file of this patent

UNITED STATES PATENTS

| 1,495,049 | Walters | May 20, 1924 |
| 1,690,920 | Bergmann et al. | Nov. 6, 1928 |
| 2,462,019 | Bowman | Feb. 15, 1949 |
| 2,668,649 | Clark et al. | Feb. 9, 1954 |